United States Patent
Shah et al.

(10) Patent No.: US 9,740,899 B1
(45) Date of Patent: Aug. 22, 2017

(54) RFID-BASED SENSORY MONITORING OF SPORTS EQUIPMENT

(71) Applicant: Motorola Mobility LLC, Chicago, IL (US)

(72) Inventors: Jagatkumar V. Shah, Lake In The Hills, IL (US); Scott P. DeBates, Crystal Lake, IL (US); Douglas Alfred Lautner, Round Lake, IL (US); Mary Khun Hor-Lao, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/403,567

(22) Filed: Jan. 11, 2017

(51) Int. Cl.
   *G06K 7/00* (2006.01)
   *G06K 19/07* (2006.01)
   *G06K 7/10* (2006.01)
   *G01P 1/00* (2006.01)

(52) U.S. Cl.
   CPC ............ *G06K 7/10415* (2013.01); *G01P 1/06* (2013.01)

(58) Field of Classification Search
   CPC .................... G06K 7/0008; G06K 19/0723
   USPC .................... 235/376; 340/10.1; 348/157
   See application file for complete search history.

(56) References Cited

U.S. PATENT DOCUMENTS

| | | | | |
|---|---|---|---|---|
| 2008/0281443 A1* | 11/2008 | Rodgers | ............. | A63B 71/0605 700/91 |
| 2009/0262137 A1* | 10/2009 | Walker | .................. | H04H 60/04 345/629 |
| 2010/0026809 A1* | 2/2010 | Curry | ..................... | H04N 5/222 348/157 |
| 2013/0113607 A1* | 5/2013 | Bolden | .................... | H04Q 9/00 340/10.1 |
| 2017/0043260 A1* | 2/2017 | Austerlade | ............ | A63F 13/798 |

* cited by examiner

*Primary Examiner* — Daniel Hess (57) ABSTRACT

In aspects of RFID-based sensory monitoring of sports equipment, a number of RFID readers are positioned throughout a sports area to interrogate RFID tags that are associated with objects, such as sports equipment, used within the sports area. An object, such as a sports ball or protective equipment, can be set in motion along a trajectory within the sports area, and a RFID tag associated with the object receives an interrogation from the RFID readers positioned throughout the sports area. The object can include sensors integrated within a housing of the object, and the sensors are implemented to sense data about the motion and the trajectory of the object, as well as contact by the object with other objects. The sensed data is then communicated from the RFID tag of the object back to the one or more RFID readers that initiated the interrogation of the RFID tag.

20 Claims, 4 Drawing Sheets

RFID-BASED SENSORY MONITORING OF SPORTS EQUIPMENT

BACKGROUND

While many sports have existed for years, only recently has technology advanced to gather, store, and analyze significant data about various aspects of different sports. Data relating to sports is becoming more imperative to players, coaches, and fans who want to track various data and information about the sports, such as statistics on specific players. Although some sports data is generally available and easily accessible, such as a baseball player's batting average, there is a great deal of information about the various aspects of different sports that is not being gathered. Collection of this information will assist the players, coaches, and fans in better understanding dimensions of the sports that have never before been analyzed.

BRIEF DESCRIPTION OF THE DRAWINGS

Aspects of RFID-based sensory monitoring of sports equipment are described with reference to the following Figures. The same numbers may be used throughout to reference like features and components that are shown in the Figures.

DETAILED DESCRIPTION

Aspects of RFID-based sensory monitoring of sports equipment are described, such as for use in a sports area with a piece of sports equipment that is implemented with one or more force and/or motion sensors integrated in the equipment. The piece of sports equipment may be a sports ball or other sports equipment such as a bat, protective pads, a glove, a helmet, or any other type of sports equipment or apparatus. A piece of sports equipment may be worn by a player of any type of sport, or may be used by a player of the sport to implement any aspect of playing the sport. In implementations of RFID-based sensory monitoring of sports equipment, the piece of sports equipment that is worn or used by a player can include an object motion unit for gathering information about different effects on the piece of sports equipment during a sporting contest or during sports practice. For example, a football player may wear several items, such as a helmet, shoulder pads, and other padding. Each one of the equipment items can incorporate an object motion unit in aspects of RFID-based sensory monitoring, such as to monitor the forces of hits and contact during play using force and motion sensors to determine possible injuries, equipment effectiveness, and aspects of injury protection. For contact sports, as in this football example, the RFID-based sensory monitoring implemented in a helmet can be used to determine and prevent concussions, and other padding worn by a player can be used to register and monitor the effects of contact, current injuries, and be used to prevent or predict potential future injuries.

In an environment for RFID-based sensory monitoring of sports equipment, a number of radio-frequency identification (RFID) readers can be positioned throughout a sports area to interrogate RFID tags that are associated with objects, such as sports equipment, used within the sports area. An object, such as a sports ball, can be set in motion along a trajectory within the sports area, and a RFID tag associated with the object receives an interrogation from the RFID readers positioned around and/or throughout the sports area. The object can include the force and/or motion sensors, such as integrated within a housing of the object, and the sensors are implemented to sense data about the motion and the trajectory of the object, such as the force upon the object and/or the motion of the object along the trajectory. The sensors in an object, such as an item of sports equipment, can also be implemented to sense data about contact with the object when the object is set in motion and makes contact with another object, such as when a player's helmet contacts the protective pads of another player during a sporting event. The sensed data is then communicated from the RFID tag of the object back to the one or more RFID readers that initiated the interrogation of the RFID tag.

The object motion unit that is implemented in a piece of sports equipment (e.g., an object) includes the sensors to register motion of the piece of sports equipment as the equipment is used for the sport. The sensors that are implemented as components of the object motion unit in an object, such as in the sports ball, can include motion sensors, such as a gyroscope or an accelerometer, and/or force sensors such as a pressure sensor, to register the trajectory and the motion of the sports ball. The sensors are implemented to sense data about the motion and the trajectory of the object, as well as contact with the object, and the data can be maintained in a memory of the RFID tag that is associated with the object. In implementations, the sensors are activated to sense the data about the object contact, the motion, and the trajectory of the object, when an interrogation of the RFID tag is received. The sensors may gather the data about the object contact, the motion, and the trajectory of the object for an appropriate amount of time based on the particular sport and the piece of sports equipment being measured.

An object motion system includes the RFID readers that are positioned throughout a sports area to interrogate RFID tags associated with objects, such as sports equipment, used within the sports area. The RFID tags that are associated with the objects in the sports area receive the interrogation from one or more of the RFID readers and, in response, communicate the data about the motion and the trajectory of a respective object back to the one or more RFID readers from which an interrogation is received. The data about the object contact, the motion, and the trajectory of an object can be communicated from the RFID tag of an object in real-time as the data is sensed by the sensors of the object. Alternatively or in addition, the data is communicated from the memory of the RFID tag of the object as a data batch after a defined amount of data has been collected. The object motion system can include a computing device that is in communication with the RFID readers located in the sports area, and the computing device can receive, store, and analyze the data, as well as generate a display output of the data and analysis results related to the motion and the trajectory of a particular object.

While features and concepts of RFID-based sensory monitoring of sports equipment can be implemented in any number of different devices, systems, environments, and/or configurations, aspects of RFID-based sensory monitoring of sports equipment are described in the context of the following example devices, systems, and methods.

Figure 1:
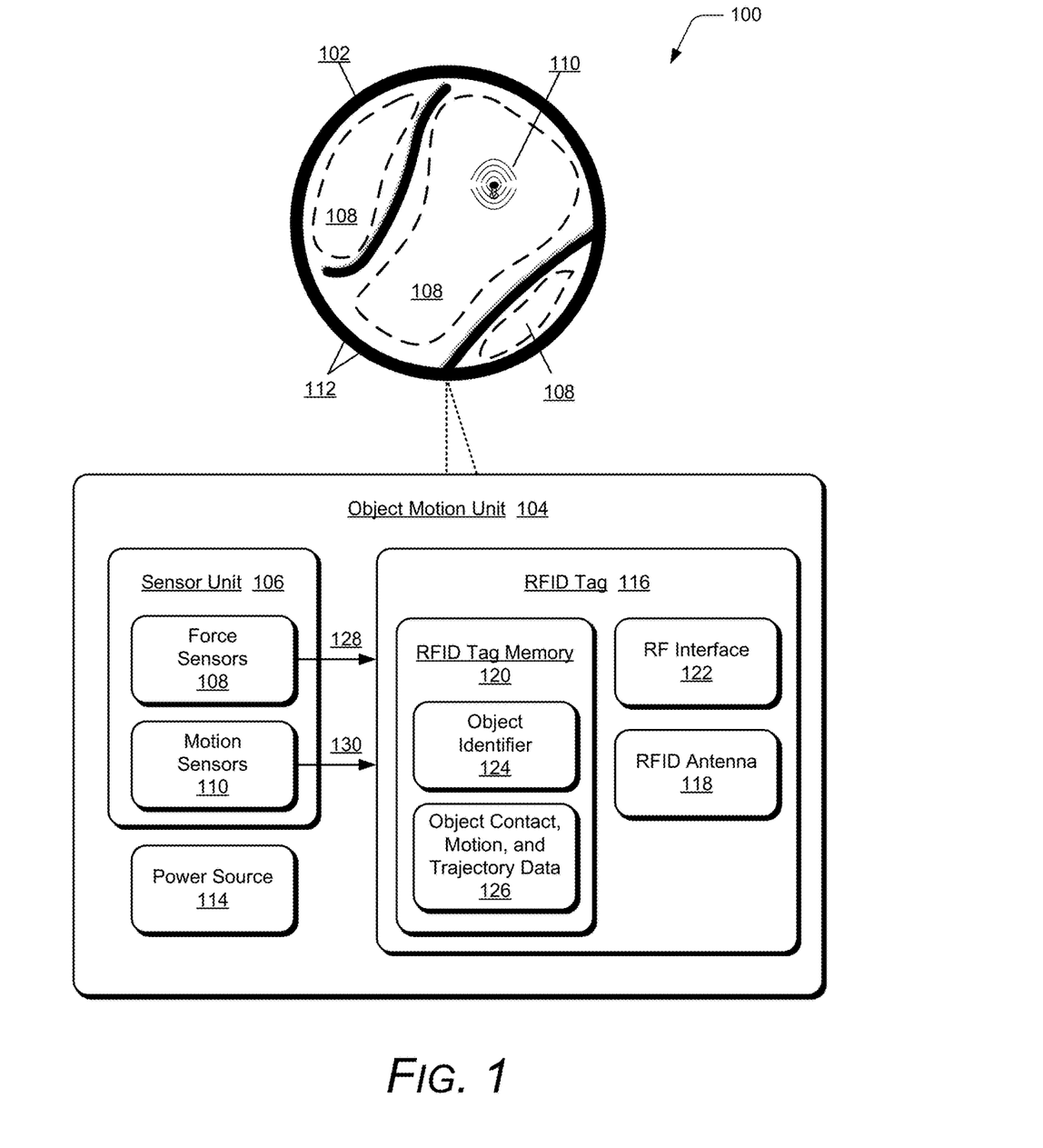
FIG. 1 illustrates an example system in which aspects of RFID-based sensory monitoring of sports equipment can be implemented.

FIG. 1 illustrates an example system 100 in which aspects of RFID-based sensory monitoring of sports equipment can be implemented. The example system 100 includes a piece of sports equipment, such as a sports ball 102 in this example. While a sports ball is generally shown and described in the examples, the techniques described for RFID-based sensory monitoring of sports equipment can be implemented for any type of sports equipment, such as any type of a sports ball, a baseball bat, racket, stick, bow, basket, goal, protective padding, uniform, functional accessory (i.e., sweatbands), gloves, hats, shoes, and any other type of sports equipment. A piece of sports equipment may be worn by a player of any type of sport, or may be used by a player of a sport to implement any aspect of playing the sport.

As noted above, an object motion unit 104 is integrated with the sports ball 102 and is implemented to register different types of force and motion that affect the sports ball when set in motion along a trajectory, such as when a soccer ball is kicked, when a football is thrown, or when a baseball is hit with a baseball bat. The object motion unit 104 has a sensor unit 106, which includes any number of force sensors 108 and/or motion sensors 110. The force sensors 108 of the sensor unit 106 are also shown positioned at different locations around the sports ball 102, such as integrated within a housing 112 of the sports ball, to sense a force applied to the sports ball. A motion sensor 110 is also shown integrated in the sports ball 102 to sense motion of the sports ball, such as when set in motion along a trajectory. While only three force sensors 108 and one motion sensor 110 are shown integrated with the sports ball 102 in this example, any suitable number of sensors may be used, and may vary based on the type of sports equipment that incorporates the sensors, or based on the types of measurements that are desired from the sensors. Any number of the sensors 108, 110 can be integrated with a piece of sports equipment to sense data about motion or force affecting the piece of sports equipment.

An example of a force sensor 108 that is integrated in a piece of sports equipment is a load cell, which converts the deformation of a material, measured by strain gauges, into an electrical signal. A load cell may be incorporated into sports equipment such as a baseball bat, stick, or bow, for example to register the force of a material deformation. Another example of a force sensor 108 is a piezoresistive force sensor, which measures a compressive force directly by compressing two layers of flexible piezoresistive ink together resulting in a change in electrical signal. A piezoresistive force sensor may be incorporated into sports equipment such as sports balls, protective pads, or gloves, for example to measure a compressive force. While only two examples of the force sensors 108 are provided, any suitable force sensor may be used to implement techniques of RFID-based sensory monitoring of sports equipment.

An example of a motion sensor 110 that is integrated in a piece of sports equipment is a gyroscope, which measures angular velocity of the sports ball 102. A gyroscope may be incorporated into a baseball bat, sports ball, or hockey puck, for example to sense the motion of the object when set in motion along a trajectory. Another example of a motion sensor 110 is an accelerometer, which measures the proper rate of change of velocity of the sports ball 102 with respect to time. An accelerometer may be incorporated into a sports ball, piece of a uniform, baseball bat, or pair of shoes, for example to sense velocity of the object as the object is in motion. While only two examples of the motion sensors 110 are provided, any suitable force sensor may be used to implement techniques of RFID-based sensory monitoring of sports equipment as described herein.

The object motion unit 104 may include a power source 114, such as a battery, to power the various components of the object motion unit. The object motion unit 104 also includes a RFID tag 116 that is associated with the sports ball 102, or generally, with each separate piece of sports equipment. Generally, a RFID tag 116 is a small electronic tag or label that can be programmed with data and other information. A RFID reader (described below with reference to FIG. 2) can transmit an interrogation signal as a broadcast message requesting RFID tags that are in range to return the data and information that RFID tags have stored. The RFID tag 116 can then wirelessly communicate the data and information to the RFID reader via radio frequency (RF) communication channel, which the RFID reader receives as RFID tag information.

The RFID tag 116 can include a RFID antenna 118, as well as a transmitter and receiver (or may be implemented as a transceiver) for two-way communication with a RFID reader. In response to receipt of an interrogation signal, an ASIC/CPU module of the RFID tag 116 formulates a response that may include data from the RFID tag, and the response is wirelessly transmitted to the RFID reader. The response signals from a RFID tag 116 can be communicated using low frequency (LF), high frequency (HF), or ultra-high frequency (UHF) radio waves. The RFID tag 116 includes a RFID tag memory 120 (e.g., non-volatile memory) that can be accessed by a RFID reader via a radio frequency (RF) interface 122 of the RFID tag 116.

The RFID tag memory 120 of the RFID tag 116 can maintain a unique object identifier 124 of the sports ball 102 (e.g., an object that the RFID tag 116 is associated with). The unique object identifiers 124 for each different object can be particularly useful in sports with sports equipment that may have a number of virtually identical sports equipment items, such as the many golf balls used during a golf match. In implementations, the RFID tag memory 120 can also receive and store (e.g., maintain) object contact, motion, and trajectory data 126. The RFID tag 116 can receive force sensor data as data inputs 128 from the force sensors 108, and receive motion sensor data as data inputs 130 from the motion sensors 110, and store the force sensor data and the motion sensor data in the RFID tag memory 120 as the object contact, motion, and trajectory data 126.

In aspects of RFID-based sensory monitoring of sports equipment, the RFID tag 116 of the object motion unit 104 in the sports ball 102 receives an interrogation from one or more RFID readers that are positioned around and/or throughout a sports area, as shown and described with reference to FIG. 2. The RFID tag 116 can receive the interrogation, or interrogations, from the RFID readers when the sports ball 102 is set in motion along a trajectory within the sports area. In response to receiving the interrogation, the RFID tag 116 can activate the force sensors 108 and/or the motion sensors 110 of the sensor unit 106 to begin sensing the object contact, motion, and trajectory data 126. The RFID tag 116 can communicate with the sensor unit 106 to control which the of the sensors 108, 110 are to collect the data, and/or how long the sensors 108, 110 are to collect the data.

As the sensors 108, 110 collect the data of the forces acting on the sports ball 102 and/or data of the motion of the sports ball 102, the RFID tag 116 can receive force sensor data as data inputs 128 from the force sensors 108, and receive motion sensor data as data inputs 130 from the motion sensors 110. The RFID tag memory 120 can then store the object contact, motion, and trajectory data 126 until the data is communicated back to the one or more RFID readers from which an interrogation is received. The object contact, motion, and trajectory data 126 about the sports ball 102 can be communicated from the RFID tag 116 in real-time as the data is sensed by the sensors of the sports ball. Alternatively or in addition, the motion and trajectory data is communicated from the RFID tag memory 120 of the RFID tag 116 as a data batch after a defined amount of the data has been collected. Further, the object identifier 124 can also be communicated to the one or more RFID readers along with the object contact, motion, and trajectory data 126 as a unique identifier of the sports ball, (e.g., the object in motion along a trajectory).

Figure 2:
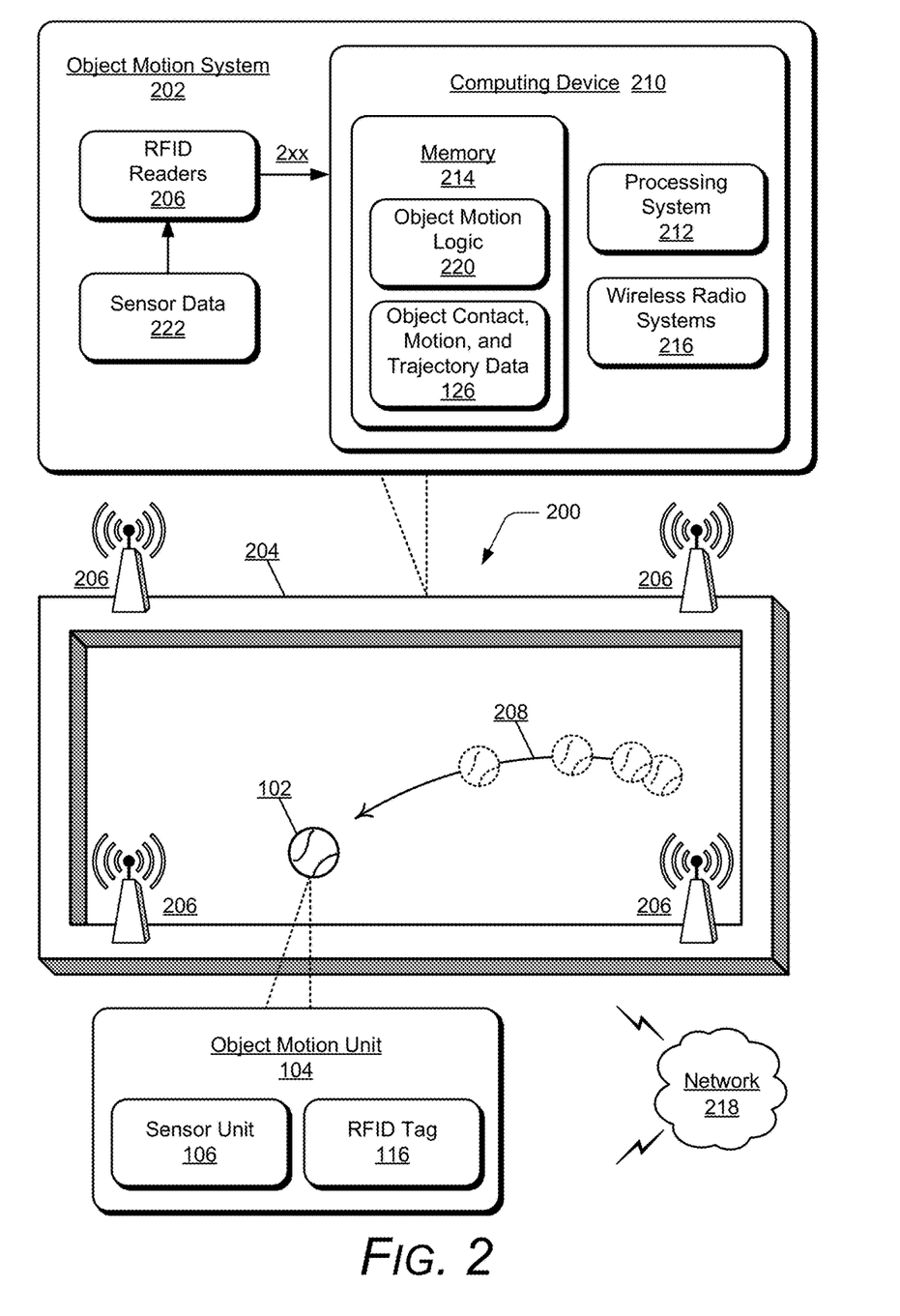
FIG. 2 further illustrates an example system in which aspects of RFID-based sensory monitoring of sports equipment can be implemented.

FIG. 2 illustrates an example environment 200 in which aspects of RFID-based sensory monitoring of sports equipment can be implemented, such equipment as the sports ball 102 described with reference to FIG. 1. The example environment 200 includes an object motion system 202 implemented in a sports area 204, such as a sports playing field or arena, in which a sporting event takes place. The object motion system 202 includes a number of RFID readers 206 that are positioned around and/or throughout the sports area 204 to interrogate RFID tags that are associated with objects, such as sports equipment, used within the sports area. For example, the RFID readers 206 can interrogate the RFID tag 116 of the object motion unit 104 that is integrated in the sports ball 102 from different angles as the sports ball is set in motion along the trajectory 208 in the sports area 204. In various scenarios to set the sports ball 102 in motion in the sports area 204, a soccer ball may be kicked by a player, a baseball batted with a baseball bat, a basketball passed between players, a football thrown by a player, a golf ball hit with a golf club, and the like.

The object motion system 202 also includes a computing device 210 implemented with computing and/or electronic device components such as a processing system 212 (e.g., one or more processors), a memory 214, and any number and combination of various components as further described with reference to the example device shown in FIG. 4. Further, the computing device 210 of the object motion system 202 can include various, different wireless radio systems 216, such as for Wi-Fi, Bluetooth™, Mobile Broadband, LTE, Near Field Communication (NFC), or any other wireless radio system or format for communication via respective wireless networks. Generally, the object motion system 202 implements the wireless radio systems 216 that each include a radio device, antenna, and chipset that is implemented for cellular, wireless, and/or other network communication with other devices, networks, and services. A wireless radio system 216 can be configured to implement any suitable communication protocol or standard for communication via a network 218.

The network 218 generally represents any type of communication and data network, and any of the server and devices, as well as the computing device 210 described herein, can communicate via the network 218 (or combination of networks), such as for data communication between the computing device 210, the object motion system 202 that is integrated in the sports area 204, and the object motion unit 104 that is integrated in the sports ball 102 (e.g., an object in the sports area 204). The network 218 can be implemented to include wired and/or wireless network. The network 218 can also be implemented using any type of network topology and/or communication protocol, and can be represented or otherwise implemented as a combination of two or more networks, to include cellular networks, IP-based networks, and/or the Internet. The network 218 may also include mobile operator networks that are managed by a network provider of a cellular network, a mobile network operator, and/or other network operators, such as a communication service provider, mobile phone provider, and/or Internet service provider.

The computing device 210 of the object motion system 202 includes object motion logic 220 that can be implemented as a software application or module, such as computer-executable software instructions that are executable with a processor (e.g., with the processing system 212). Similarly, the computing device 210 may also include an operating system as a software application. The object motion logic 220 and/or the operating system can be stored on computer-readable storage memory (e.g., the memory 214), such as any suitable memory device or electronic data storage implemented with the computing device. Although generally illustrated and described as a component of the object motion system 202, the computing device 210 may be implemented as an independent and/or remote computing device in communication with the object motion system 202 and/or the RFID readers 206, such as via the network 218.

In implementations, the RFID readers 206 receive the sensed data from the RFID tag 116 as the sensor data 222 when the RFID readers interrogate RFID tags that are associated with objects, such as sports equipment, used within the sports area 204. For example, the RFID readers 206 interrogate the RFID tag 116 of the object motion unit 104 that is integrated in the sports ball 102 in the sports area 204. The RFID readers 206 can transmit an interrogation signal as a broadcast message requesting RFID tags (e.g., RFID tag 116) that are in range to return the data and information the RFID tags have stored. The RFID tags can then wirelessly communicate the data and information to the RFID readers via a radio frequency (RF) communication channel, which the RFID readers receive as RFID tag information, such as sensor data 222.

The RFID readers 206 then receive the object contact, motion, and trajectory data 126 as the sensor data 222 from the RFID tag memory 120. Alternatively or in addition, the RFID readers 206 can receive the force sensor data detected by the force sensors 108 and receive the motion sensor data detected by the motion sensors 110 in real-time as the sensors sense the data about the motion and the trajectory 208 of the sports ball 102 (e.g., the object) in the sports area 204. An instance of the object contact, motion, and trajectory data 126 can also be stored and maintained in the memory 214 of the computing device 210 at the object motion system 202.

Using baseball as an example sport, an instance of the object motion unit 104 located within a baseball (e.g., the sports ball 102) can be implemented to collect data from the sensors of the sensor unit 106 from the time a pitcher begins to pitch the baseball until the baseball concludes motion after being caught by the catcher, or after being hit by a batter and stopped from motion in the field. Another instance of the object motion unit 104 located within the batter's shoe can be implemented to collect data from the time the batter enters the batter's box until the batter returns to the dugout, such as after striking out, or until completing a round of the bases after hitting a home run, for example. Another instance of the object motion unit 104 located in a sweatband on a pitcher's arm can be implemented to collect data before each pitch until the pitching motion concludes to determine the motion and trajectory data related to the pitcher throwing the baseball. This data related to the pitcher throwing the baseball can then be compared by the object motion logic 220 to the data related to the motion and trajectory of the baseball itself. These are but a few examples of implementations of RFID-based sensory monitoring of sports equipment during particular durations, and are not intended to be limiting.

Example method 300 is described with reference to FIG. 3 in accordance with implementations of RFID-based sensory monitoring of sports equipment. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
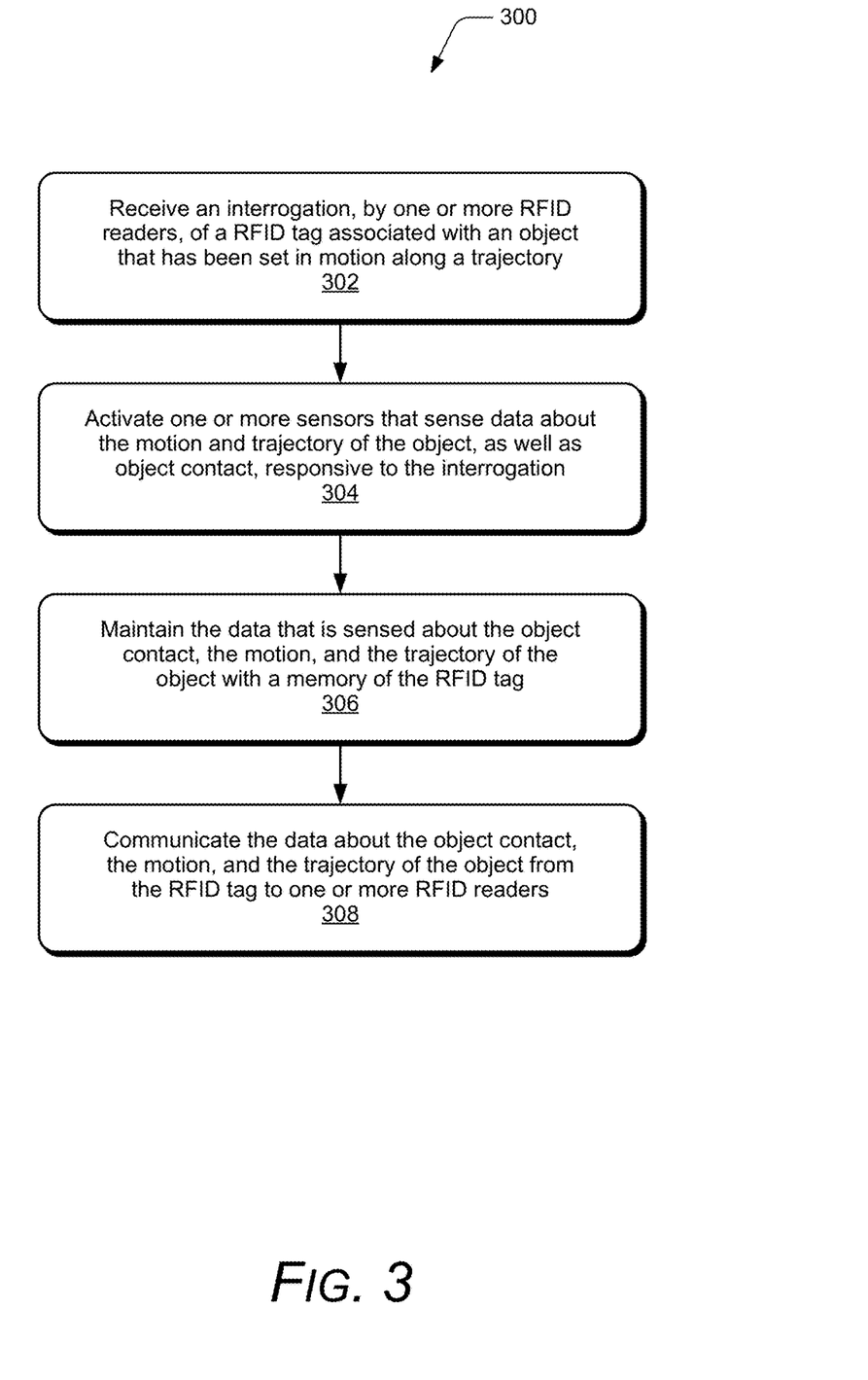
FIG. 3 illustrates example method(s) of RFID-based sensory monitoring of sports equipment in accordance with techniques described herein.

FIG. 3 illustrates example method(s) 300 of RFID-based sensory monitoring of sports equipment as described herein, and is generally described with reference to the object motion system in a sports area and the object motion unit implemented in a piece of sports equipment. The order in which the method is described is not intended to be construed as a limitation, and any number or combination of the described method operations can be performed in any order to perform a method, or an alternate method.

At 302, an interrogation by one or more RFID readers is received by a RFID tag associated with an object that has been set in motion along a trajectory. For example, the sports ball 102 (e.g., an object) includes the RFID tag 116, which receives an interrogation from one or more of the RFID readers 206 that are located around and/or throughout the sports area 204 as the sports ball is in motion along the trajectory 208 in the sports area. The sports ball 102 may have been set in motion along the trajectory by any cause associated with playing any type of sport.

At 304, one or more sensors that sense data about the motion and trajectory of the object, as well as object contact, are activated in response to receiving the interrogation. For example, the sensor unit 106 includes the force sensors 108 that are activated to sense a force applied to the sports ball 102 and/or includes the motion sensors 110 that are activated to sense motion of the sports ball 102, such as when set in motion along the trajectory 208 and in response to receiving the interrogation. The sensors of the sensor unit 106 also sense data about contact with the object when the object is set in motion and makes contact with another object.

At 306, the data that is sensed about the object contact, the motion, and the trajectory of the object is maintained with a memory of the RFID tag. For example, the RFID tag memory 120 receives and stores (e.g., maintains) the object contact, motion, and trajectory data 126 as the RFID tag 116 receives the force sensor data from the force sensors 108, and receives the motion sensor data from the motion sensors 110. The force sensor data and the motion sensor data is stored in the RFID tag memory 120 as the object contact, motion, and trajectory data 126.

At 308, the data about the object contact, motion, and trajectory of the object is communicated from the RFID tag to the RFID reader. For example, the object contact, motion, and trajectory data 126 about the motion and the trajectory 208 of the object is communicated to the one or more RFID readers 206 in real-time as the one or more sensors of the sensor unit 106 sense and collect the data. Alternatively or in addition, the object contact, motion, and trajectory data 126 is communicated to the one or more RFID readers 206 as a data batch after a defined amount of data has been collected, or after a defined amount of time has passed since receiving the interrogation.

Figure 4:
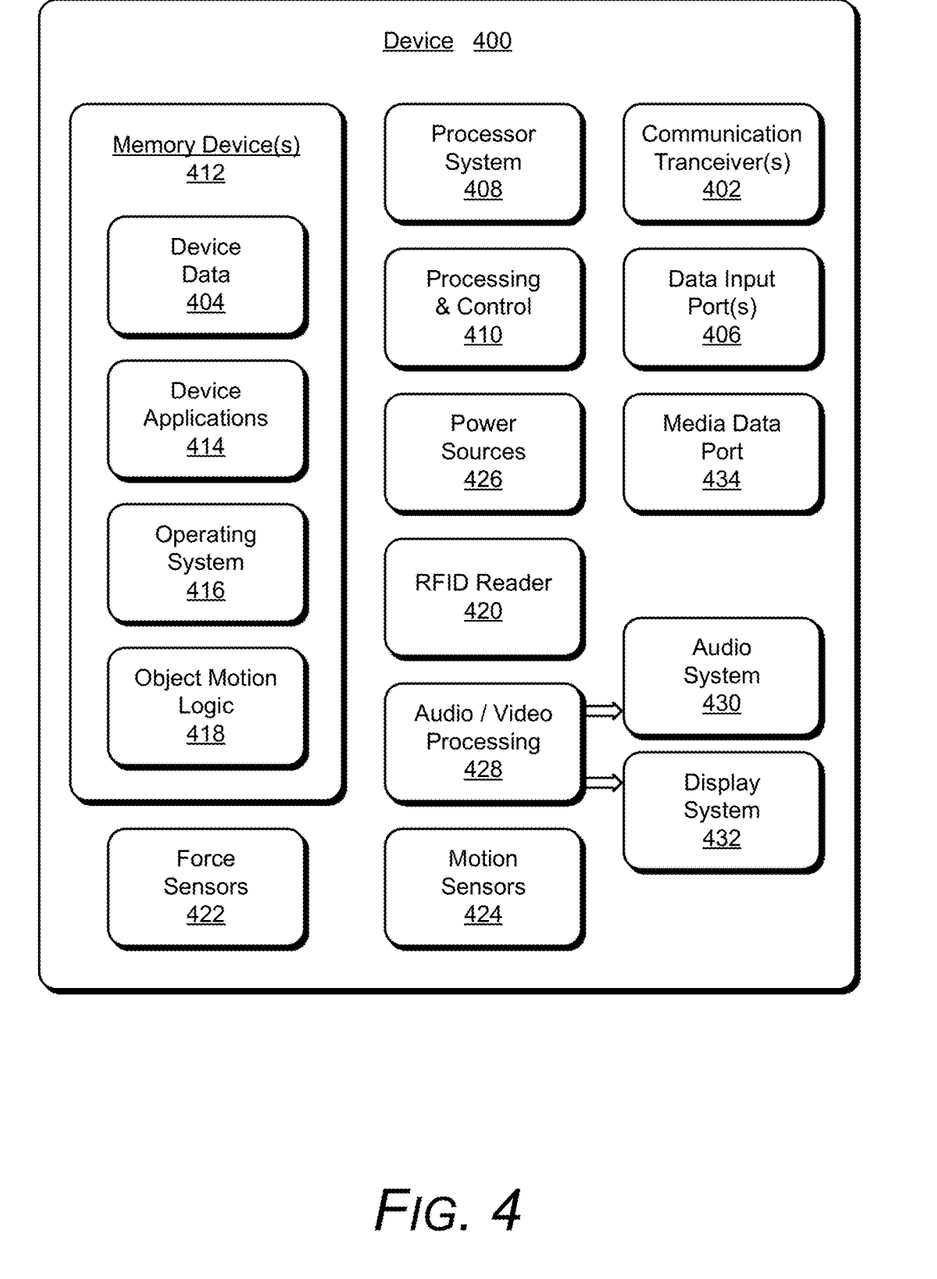
FIG. 4 illustrates various components of an example device that can implement aspects of RFID-based sensory monitoring of sports equipment.

FIG. 4 illustrates various components of an example device 400 in which aspects of RFID-based sensory monitoring of sports equipment can be implemented. The example device 400 can be implemented as any of the devices described with reference to the previous FIGS. 1-3, such as any type of client device, mobile phone, tablet, computing, communication, entertainment, gaming, media playback, and/or other type of electronic device, to include the object motion unit 104 implemented as a "device" that is integrated in a piece of sports equipment. For example, the object motion unit 104, the object motion system 202, and/or the computing device 210 shown in FIGS. 1 and 2 may be implemented as the example device 400.

The device 400 includes communication transceivers 402 that enable wired and/or wireless communication of device data 404 with other devices, such as object motion data and information related to the motion and trajectory of sports equipment that is set in motion as described with reference to FIGS. 1-3. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (Wi-MAX™) standards, and wired local area network (LAN) Ethernet transceivers for network data communication.

The device 400 may also include one or more data input ports 406 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 400 includes a processing system 408 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 410. The device 400 may further include any type of a system bus or other data and command transfer system that couples the various components within the device. A system bus can include any one or combination of different bus structures and architectures, as well as control and data lines.

The device 400 also includes computer-readable storage memory 412 (e.g., memory devices) that enable data storage, such as data storage devices that can be accessed by a computing device, and that provide persistent storage of data and executable instructions (e.g., software applications, programs, functions, and the like). Examples of the computer-readable storage memory 412 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 400 may also include a mass storage media device.

The computer-readable storage memory 412 provides data storage mechanisms to store the device data 404, other types of information and/or data, and various device applications 414 (e.g., software applications). For example, an operating system 416 can be maintained as software instructions with a memory device and executed by the processing system 408. The device applications may also include a device manager, such as any form of a control application, software application, signal-processing and control module, code that is native to a particular device, a hardware abstraction layer for a particular device, and so on. In this example, the device 400 includes object motion logic 418 that implements aspects of RFID-based sensory monitoring of sports equipment, and may be implemented with hardware components and/or in software, such as when the device 400 is implemented as the object motion unit 104, the object motion system 202, or the computing device 210 described with reference to FIGS. 1-3.

The device 400 can also include a radio-frequency identification (RFID) reader 420, as well as force sensors 422 and motion sensors 424. The device 400 can also include one or more power sources 426, such as when the device is implemented as a mobile device (e.g., the object motion unit 104 that is integrated in a piece of sports equipment). The power sources may include a charging and/or power system, and can be implemented as a flexible strip battery, a rechargeable battery, a charged super-capacitor, and/or any other type of active or passive power source.

The device 400 also includes an audio and/or video processing system 428 that generates audio data for an audio system 430 and/or generates display data for a display system 432. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 434. In implementations, the audio system and/or the display system are integrated components of the example device. Alternatively, the audio system and/or the display system are external, peripheral components to the example device.

Although aspects of RFID-based sensory monitoring of sports equipment have been described in language specific to features and/or methods, the subject of the appended claims is not necessarily limited to the specific features or methods described. Rather, the specific features and methods are disclosed as example implementations of RFID-based sensory monitoring of sports equipment, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following embodiments.

A method comprising: receiving an interrogation, by a radio-frequency identification (RFID) reader, of a RFID tag associated with an object that has been set in motion along a trajectory; responsive to said receiving the interrogation: activating one or more sensors that sense data about the motion and the trajectory of the object; and communicating the data about the motion and the trajectory of the object from the RFID tag to the RFID reader.

Alternatively or in addition to the above described method, any one or combination of: The one or more sensors are integrated with the object to sense the data about the motion and the trajectory of the object. The method further comprising maintaining the data that is sensed by the one or more sensors as collected data with a memory of the RFID tag. The object is a sports ball used during a sporting event and the sports ball is set in the motion within a sports area in which the sporting event takes place. The motion of the object is through a designated area in which a sporting event takes place, and the RFID reader is one of multiple RFID readers located throughout the designated area; and the data about the motion and the trajectory of the object is communicated from the RFID tag to one or more of the multiple RFID readers. The data is communicated from the RFID tag to the RFID reader in real-time as the data is sensed by the one or more sensors. The method further comprising: storing the data about the motion and the trajectory of the object in a memory of the RFID tag; and wherein the data is communicated from the memory of the RFID tag to the RFID reader as a data batch after a defined amount of data has been collected. The one or more sensors include at least one of an accelerometer, a gyroscope, and a force sensor to sense the data about the motion and the trajectory of the object.

An object comprising: one or more sensors that sense data about contact with the object when the object is set in motion and makes the contact with another object; and a radio-frequency identification (RFID) tag that receives an interrogation from a RFID reader, and responsive to the interrogation, communicates the data about the contact and the motion of the object to the RFID reader.

Alternatively or in addition to the above described object, any one or combination of: The one or more sensors are integrated in a housing of the object to sense the data when the object is set in motion along a trajectory of the object. The one or more sensors include at least one of an accelerometer, a gyroscope, and a force sensor to sense the data about the contact and the motion of the object. The RFID tag includes a memory that maintains the data from the one or more sensors as collected data; and the RFID tag communicates the collected data from the memory of the RFID tag to the RFID reader. The RFID tag communicates the data to the RFID reader in real-time as the data is sensed by the one or more sensors. The object is protective equipment used during a sporting event and the protective equipment makes the contact when set in the motion within a sports area in which the sporting event takes place. The motion of the object is through a designated area in which a sporting event takes place, and the RFID reader is one of multiple RFID readers located throughout the designated area; and the RFID tag communicates the data about the contact and the motion of the object to one or more of the multiple RFID readers.

A system comprising: at least one radio-frequency identification (RFID) reader positioned to interrogate RFID tags within a region; an object set in motion along a trajectory within the region, the object comprising: one or more sensors that sense data about the motion and the trajectory of the object within the region; and a RFID tag that initiates the one or more sensors to sense the data about the motion and the trajectory of the object responsive to an interrogation from the RFID reader, and the RFID tag communicates the data to the RFID reader.

Alternatively or in addition to the above described system, any one or combination of: Multiple RFID readers are positioned to interrogate the RFID tag within the region, wherein the multiple RFID readers are positioned to receive the communicated data from the object at different locations and from different angles within the region. The object is a sports ball used during a sporting event and the sports ball is set in the motion within the region in which the sporting event takes place. The one or more sensors are integrated in a housing of the object to sense the data about the motion and the trajectory of the object. The one or more sensors include at least one of an accelerometer, a gyroscope, and a force sensor.

The invention claimed is:

1. A method, comprising:
   receiving an interrogation, by a radio-frequency identification (RFID) reader, of a RFID tag associated with an object that is in motion along a trajectory;
   responsive to said receiving the interrogation:
      activating one or more sensors that sense data about the motion and the trajectory of the object, the one or more sensors including a force sensor to sense the data about a material deformation of the object; and
      communicating the data about the motion and the trajectory of the object from the RFID tag to the RFID reader.

2. The method as recited in claim 1, wherein the one or more sensors are integrated with the object to sense the data about the motion and the trajectory of the object.

3. The method as recited in claim 1, further comprising maintaining the data that is sensed by the one or more sensors as collected data with a memory of the RFID tag.

4. The method as recited in claim 1, wherein the object is a sports ball used during a sporting event and the sports ball is set in the motion within a sports area in which the sporting event takes place.

5. The method as recited in claim 1, wherein:
   the motion of the object is through a designated area in which a sporting event takes place, and the RFID reader is one of multiple RFID readers located throughout the designated area; and
   the data about the motion and the trajectory of the object is communicated from the RFID tag to one or more of the multiple RFID readers.

6. The method as recited in claim 1, wherein the data is communicated from the RFID tag to the RFID reader in real-time as the data is sensed by the one or more sensors.

7. The method as recited in claim 1, further comprising:
   storing the data about the motion and the trajectory of the object in a memory of the RFID tag; and
   wherein the data is communicated from the memory of the RFID tag to the RFID reader as a data batch after a defined amount of data has been collected.

8. The method as recited in claim 1, wherein the one or more sensors further include at least one of an accelerometer and a gyroscope to sense the data about the motion and the trajectory of the object.

9. An object, comprising:
   one or more sensors that sense data about contact with the object when the object is in motion and makes the contact with another object, the one or more sensors including a force sensor to sense the data about a material deformation of the object during the contact with the other object; and
   a radio-frequency identification (RFID) tag that receives an interrogation from a RFID reader, and responsive to the interrogation, communicates the data about the contact and the motion of the object to the RFID reader.

10. The object as recited in claim 9, wherein the one or more sensors are integrated in a housing of the object to sense the data when the object is set in motion along a trajectory of the object.

11. The object as recited in claim 9, wherein the one or more sensors further include at least one of an accelerometer and a gyroscope to sense the data about the contact and motion of the object.

12. The object as recited in claim 9, wherein:
   the RFID tag includes a memory that maintains the data from the one or more sensors as collected data; and
   the RFID tag communicates the collected data from the memory of the RFID tag to the RFID reader.

13. The object as recited in claim 9, wherein the RFID tag communicates the data to the RFID reader in real-time as the data is sensed by the one or more sensors.

14. The object as recited in claim 9, wherein the object is protective equipment used during a sporting event and the protective equipment makes the contact when in the motion within a sports area in which the sporting event takes place.

15. The object as recited in claim 9, wherein:
   the motion of the object is through a designated area in which a sporting event takes place, and the RFID reader is one of multiple RFID readers located throughout the designated area; and
   the RFID tag communicates the data about the contact and the motion of the object to one or more of the multiple RFID readers.

16. A system, comprising:
   at least one radio-frequency identification (RFID) reader positioned to interrogate RFID tags within a region;
   an object of sporting equipment in motion along a trajectory within the region during a sporting event, the object comprising:
      one or more sensors that sense data about the motion and the trajectory of the object within the region; and
      a RFID tag that initiates the one or more sensors to sense the data about the motion and the trajectory of the object for an amount of time based on a type of sport of the sporting event and a type of sporting equipment of the object responsive to an interrogation from the RFID reader, and the RFID tag communicates the data to the RFID reader.

17. The system as recited in claim 16, further comprising multiple RFID readers positioned to interrogate the RFID tag within the region, wherein the multiple RFID readers are positioned to receive the communicated data from the object at different locations and from different angles within the region.

18. The system as recited in claim 16, wherein the object is a sports ball used during the sporting event and the sports ball is set in the motion within the region in which the sporting event takes place.

19. The system as recited in claim 16, wherein the one or more sensors are integrated in a housing of the object to sense the data about the motion and the trajectory of the object.

20. The system as recited in claim 16, wherein the one or more sensors include at least one of an accelerometer, a gyroscope, and a force sensor.

* * * * *